US010176395B2

(12) United States Patent
Abbas

(10) Patent No.: US 10,176,395 B2
(45) Date of Patent: *Jan. 8, 2019

(54) AUTOMATIC CORRECTION OF SKEWING OF DIGITAL IMAGES

(71) Applicant: International Business Machines Corporation, Armonk, NY (US)

(72) Inventor: Ahmed Abbas, Giza (EG)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/408,835

(22) Filed: Jan. 18, 2017

(65) Prior Publication Data

US 2017/0193321 A1 Jul. 6, 2017

Related U.S. Application Data

(63) Continuation of application No. 14/878,547, filed on Oct. 8, 2015, now Pat. No. 9,621,761.

(51) Int. Cl.
*G06K 9/32* (2006.01)
*G06K 9/40* (2006.01)
(Continued)

(52) U.S. Cl.
CPC ....... *G06K 9/3283* (2013.01); *G06K 9/00442* (2013.01); *G06K 9/3275* (2013.01);
(Continued)

(58) Field of Classification Search
None
See application file for complete search history.

(56) References Cited

U.S. PATENT DOCUMENTS 4,338,588 A 7/1982 Chevillat et al.
4,723,297 A 2/1988 Postl
(Continued)

FOREIGN PATENT DOCUMENTS

WO WO 2000038100 A1 6/2000

OTHER PUBLICATIONS

Louloudis et al., A Block-Based Hough Transform Mapping for Text Line Detection in Handwritten Documents, HAL archives-ouvertes, HAL Id: inria-00112648 http://hal.inria.fr/inria-00112648, submitted on Nov. 9, 2006, 7 pages.

(Continued)

*Primary Examiner* — Helen Zong
(74) *Attorney, Agent, or Firm* — Schmeiser, Olsen & Watts, LLP; Isaac Gooshaw

(57) ABSTRACT

A method and system. An initial angle of rotation is determined by sampling test angles of rotation of a captured digital image and analyzing resultant rotated images to determine a resultant rotated image with a highest number of substantially empty lines. The captured digital image is rotated by the initial angle of rotation to generate a first rotated image. A representative line of each line area of multiple text line areas of the first rotated image is generated. A slope of each representative line is calculated. An aggregated slope of the representative lines is determined. The aggregated slope is converted to a refining angle of rotation. The refining angle of rotation is validated by finding points of intersection of lines connecting opposing ends of adjacent representative lines. The first rotated image is rotated by the refining angle of rotation to result in a final rotated image.

17 Claims, 11 Drawing Sheets

(51) Int. Cl.
  *G06K 9/00* (2006.01)
  *H04N 1/387* (2006.01)
  *H04N 1/04* (2006.01)
(52) U.S. Cl.
  CPC ............... *G06K 9/40* (2013.01); *H04N 1/04* (2013.01); *H04N 1/3878* (2013.01); *G06K 2209/01* (2013.01)

(56) References Cited

U.S. PATENT DOCUMENTS

| | | |
|---|---|---|
| 5,233,168 A | 8/1993 | Kulik |
| 5,313,311 A | 5/1994 | Brandkamp |
| 5,638,466 A | 6/1997 | Rokusek |
| 6,310,984 B2 | 10/2001 | Sansom-Wai et al. |
| 6,529,641 B1 | 3/2003 | Chakraborty |
| 6,687,421 B1 | 2/2004 | Navon |
| 7,200,285 B2 | 4/2007 | Li et al. |
| 7,376,285 B2 | 5/2008 | Song |
| 8,027,067 B2 | 9/2011 | Zhao et al. |
| 8,160,393 B2 | 4/2012 | Honsinger et al. |
| 8,358,871 B2 | 1/2013 | Tu et al. |
| 8,588,549 B2 | 11/2013 | Yi |
| 2009/0268264 A1 | 10/2009 | Minamino |
| 2010/0174732 A1 | 7/2010 | Levy et al. |
| 2015/0248777 A1 | 9/2015 | Konishi et al. |
| 2015/0373199 A1 | 12/2015 | Tonouchi et al. |

OTHER PUBLICATIONS

Kaur et al., An Integrated Skew Detection and Correction Using Fast Fourier Transform and DCT, International Journal of Scientific & Technology Research vol. 2, Issue 12, Dec. 2013, 6 pages.

Nakano et al., An Algorithm for the Skew Normalization of Document Image, CH2898-5/90/0000/0008, copyright 1990 IEEE, 6 pages.

Hinds, et al., A Document Skew Detection Method Using Run-Length Encoding and the Hough Transform, CH2895-5/90/0000/0464, copyright 1990 IEEE, 5 pages.

Srihari et al., Analysis of Textual Images Using the Hough Transform, Machine Vision and Applications (1989) 2:141-153, 13 pages.

Kumar et al., Modified Approach of Hough Transform for Skew Detection and Correction in Documented Images, http://citeseerx.ist.psu.edu/viewdoc/summary?doi=10.1.1.258.9104, Retrieved on Mar. 30, 2015, 1 page.

Singh et al., Improved Skew Detection and Correction Approach Using Discrete Fourier Algorithm, copyright 2007-2015 The Pennsylvania State University, 1 page.

Office Action (dated Aug. 10, 2016) for U.S. Appl. No. 14/878,547, filed Oct. 8, 2015.

Amendment (dated Nov. 9, 2016) for U.S. Appl. No. 14/878,547, filed Oct. 8, 2015.

Notice of Allowance (dated Dec. 2, 2016) for U.S. Appl. No. 14/878,547, filed Oct. 8, 2015.

AUTOMATIC CORRECTION OF SKEWING OF DIGITAL IMAGES

This application is a Continuation application claiming priority to Ser. No. 14/878,547, filed Oct. 8, 2015, now U.S. Pat. No. 9,621,761, issued Apr. 11, 2017.

TECHNICAL FIELD

The present invention relates to automatic correction of digital images, and more specifically, to automatic correction of skewing of digital images.

BACKGROUND

Scanned documents can be skewed due to common challenges with the image capturing process. This applies to images of documents taken by scanners, digital cameras including mobile cameras, or other capturing apparatus.

SUMMARY

Embodiments of the present invention provide a computer-implemented method, and associated system and computer program product, for automatic correction of skewing of digital images. A captured digital image for processing as an input image is provided. An initial angle of rotation is determined by sampling a plurality of test angles of rotation of the input image and analyzing resultant rotated images to determine a resultant rotated image with a highest number of substantially empty lines. The input image is rotated by the initial angle of rotation to generate a first rotated image. The first rotated image is processed to determine a refining angle of rotation, including: determining text line areas of the first rotated image; generating a representative line of each text line area; calculating a slope of each representative line; and determining an aggregated slope of all the representative lines in the first rotated image, wherein the aggregated slope is converted to the refining angle of rotation; and rotating the first rotated image by the refining angle of rotation to result in a final rotated image.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Skewing of an image not only makes reading a document more difficult, but it also affects the quality of Optical Character Recognition (OCR) that can be applied to the captured document.

Therefore, solving this skewing problem would result in improved capability for computers to process the content of scanned documents and allow digital systems to deal with data that is sourced from hardcopies, captured using cameras or any digital image capturing device.

The problem is not new and there are several solutions in place each of which has its own limitations.

The use of Hough transforms is known in this field, however use of Hough transforms is dependent on the quality of the input data. The transform is less efficient when dealing with noise. For example, edge detection may significantly suffer if there is a watermark, a stain, or the edges are distorted. Furthermore, the transform when applied on its own does not provide a means of validating the accuracy of the transform. In other words, the accuracy of a method that depends on Hough transform is highly sensitive to the quality of the content of the text within the text lines. Unless otherwise stated or implied, "pixel line", "text line", and "line" are synonymous in this description of the invention.

If the quality of scanned text and/or physical paper is poor, the accuracy of the transform suffers.

The use of Fast Fourier transforms is also known in this field. The irregular pattern of letters (and other scan or page deformations) results in considerable noise within the transform result which requires further costly processing such as applying morphological operators.

Therefore, there is a need in the art to address the aforementioned problems.

The described method and system of the present invention, in one embodiment, finds an angle of rotation that makes a captured digital image look as much as possible like a page with text lines that are parallel or substantially parallel to each other. Text lines may be substantially parallel, for example, if the text lines are handwritten without guiding lines.

Figure 1:
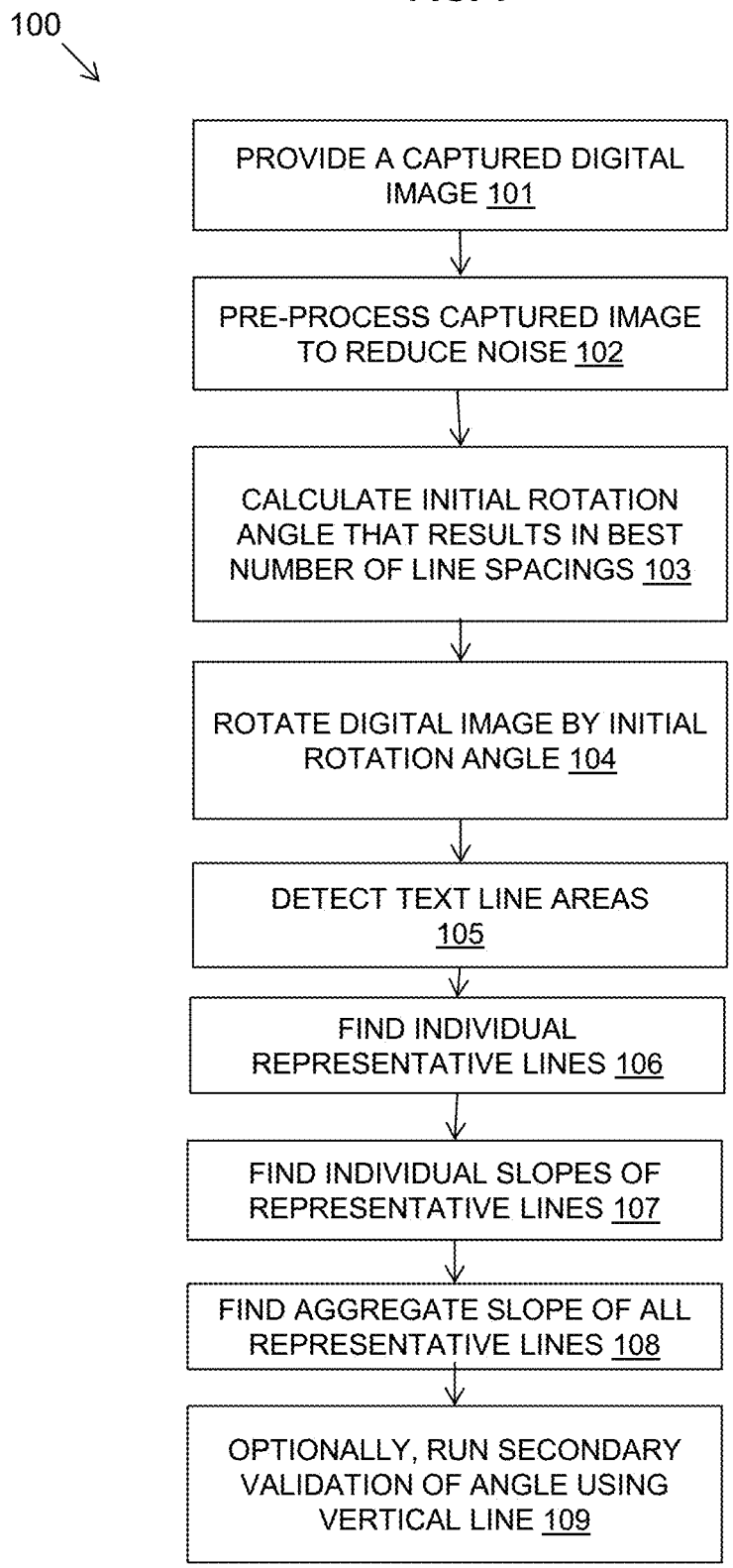
FIG. 1 is a flow diagram of an example embodiment of the method of the present invention.

Referring to FIG. 1, a flow diagram 100 shows an example embodiment of the method of the present invention.

A captured digital image may be provided (step 101) for processing. The digital image may be captured from an original document by scanning, by a digital camera, or may be stored on some other electronic device. The captured digital image may be moved (e.g., rotated) within a fixed rectangular coordinate system that is fixed in a background or "page" on which the digital image appears. The rectangular coordinate system has a horizontal axis and a vertical axis which are perpendicular to each other. The horizontal axis defines a horizontal direction and the vertical axis defines a vertical direction. If the captured digital image were not skewed, then the text lines of the digital image would be parallel to the horizontal direction. Unless otherwise stated or implied, all angles in this description of the invention are relative to a reference direction in the rectangular coordinate system. The reference direction may be any fixed direction (e.g., the horizontal direction, the vertical direction, etc.) in the rectangular coordinate system.

Pre-processing (step 102) of the captured digital image may be carried out to reduce noise in the image. The image may be modified for better subsequent processing by using methods to filter out part of the noise (e.g. color, contrast, font used, text language, stains, deformed edges, handwritten marks not written in lines, etc.). This pre-processing improves the accuracy of deskewing.

An initial rotation angle is then calculated (step 103) as the initial rotation angle that results in the best number of line spacings after pre-processing the input image to reduce the effect of noise. The best number of line spacings is determined by the highest number of substantially empty lines of pixels in a rotated image. Further details of step 103 are given with respect to FIG. 2. Step 103 may be a relatively low processing cost method to find an initial angle of rotation before carrying out a more intense processing from the initial angle.

After rotating (step 104) the digital image at the best initial rotation angle, text line areas are detected (step 105) as areas of adjacent lines, each line with a sufficient or threshold number of non-empty pixels, wherein there is a text line area between two empty lines. Further details of step 105 are given with respect to FIG. 3.

An individual representative line for each text line area is determined (step 106) and a deskew angle is calculated (step 107) for each representative line by finding individual slopes of representative lines. A refined deskewing angle is calculated (step 108) based on the aggregated slopes of the representative lines of all the detected text line areas in the digital image. Further details of steps 106-108 are given with respect to FIG. 4.

The deskew rotation angle is calculated by taking into consideration the slope of each individual representative line even if the text lines are not uniform or parallel to each other.

Lines may be detected by combining the three parameters together of line spacing, density of lines of points, and density of points comprising a line, for example. Threshold values may be used to further reduce the weight of noise mentioned above.

Thresholds may be calculated in a relative manner based on values that are driven from the same image characteristics. For example, if statistically most of the lines' slopes are between 35 and 40 degrees, and one line is identified as having a slope of 70 degrees, a threshold of 40 degrees as an upper limit and 35 degrees as a lower limit may be applied with exclusion of any lines outside the thresholds. A similar approach may be made to a line's height. For example, a minimum text line height may be based on the height of all detected text lines on the image.

Optionally, a secondary validation may be carried out (step 109) using, for example, a substantially vertical line cutting the averaged centers of detected representative text lines to determine the accuracy of the deskewing. This secondary validation is based on the aggregated relationship of each two consecutive text lines to assess the quality of the deskew rotation angle calculated above. Further details of step 109 are given with respect to FIG. 5.

Figure 2:
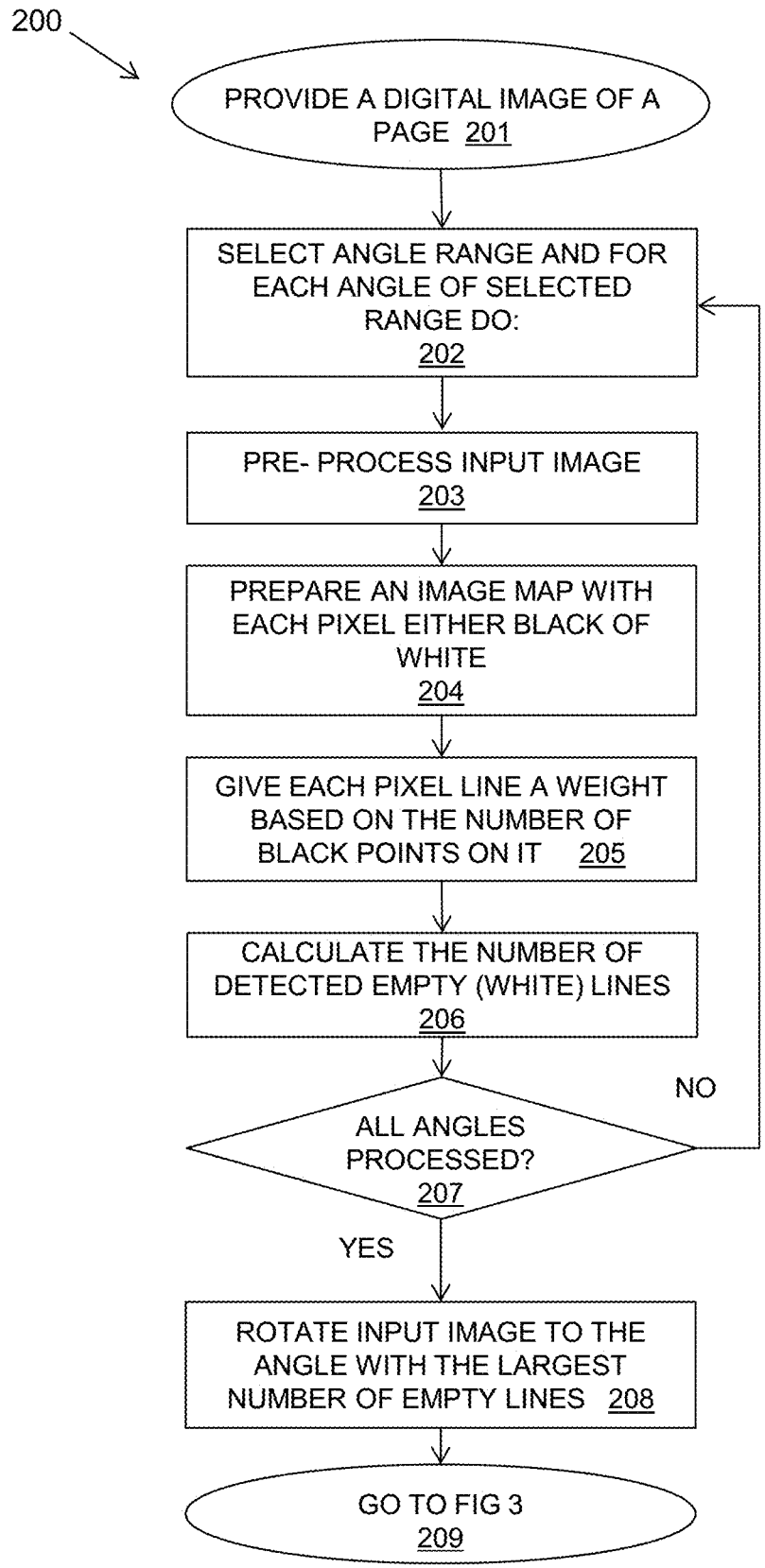
FIG. 2 is a flow diagram of further details of the method of FIG. 1.

Referring to FIG. 2, a flow diagram 200 shows a further example implementation detail of step 103 of FIG. 1 of calculating an initial rotation angle of a digital image. A best initial rotation angle is determined before the angle is fine-tuned with further analysis as described in the subsequent flow diagrams.

A digital image is provided (step 201), which may be acquired by scanning, taken by a digital camera, or already stored on some electronic device.

A range of angles to be selected is determined (step 202) as an input parameter. For example, the range of angles can be from −90 degrees to +90 degrees. Although the algorithm is capable of going beyond this range, it is not mended as it may result in rotating the image upside down of its intended orientation.

For each incremented angle of the range, the following steps may be carried out. The incremented angle may be chosen so that the angle is not too large as to miss the optimum angle, whilst being not too small as to increase the resource consumption of processing.

The input image may be pre-processed (step 203) which is similar to the pre-processing carried out at step 102 of FIG. 1, but is more costly at this stage. Therefore, the pre-processing may only be carried out when the method has more confidence in the initial image orientation angle. At this stage, the original image and carry out additional pre-processing methods are analyzed.

The image may be converted (step 204) to binary black and white or gray scale to reduce the effect of colors and physical deformations that might have been on the originally provided digital image.

A blur filter may be applied to the image to reduce the effect of individual parts of a text line on the overall text line area calculated slope. Application of the blur filter also reduces the effect of noise that might be scattered within or outside text lines across the page. Since the method is dealing with the concentration of points in the form of pixels, the blur filter filters out scattered individual points that are not typically part of text lines (for example, a black dot that was printed out by a printer, or a piece of small dust on the original hardcopy). The blur filter reduces the effect of such noise.

A bitmap may be created of the image where the number of bits in any pixel below a set pixel content threshold is considered white; otherwise, the pixel is considered black. The pixel content threshold is expressed as a threshold number of bits. The pixel content threshold may be one of the input parameters to the algorithm. This binarization of white/black reduces the noise of weak spots regardless of their size on the page and at the same time reduces the number of points to be processed with the algorithm to save computing power.

Using the image bitmap, a weight is given (step 205) for each pixel line based on the number of black pixels on that pixel line.

Using the weights calculated, empty pixel lines and the non-empty pixel lines are determined. That is, any pixel line whose weight is less than a set line content threshold (expressed as a threshold number of black pixels) is considered empty; otherwise, the pixel line is considered non-empty. This weight of a pixel line relative is a measure of how weak the pixel line is. The set line content threshold may be one of the input parameters to the algorithm. The number of detected pixel lines considered empty is determined (step 206).

It is then determined (step 207) if all the angles in the selected range have been processed. If all the angles in the selected range have not been processed, then the method loops to step 202 and a next angle has steps 203 to 206 applied. Once all angles have been processed, the method continues at step 208.

An initial rotation angle is set (step 208) to the value of the angle that resulted in the largest number of empty lines, which means that the text lines on the page are likely to be ordered in a parallel or semi-parallel manner at this angle. The method then proceeds (step 209) to the method of the flow diagram 300 of FIG. 3.

Figure 3:
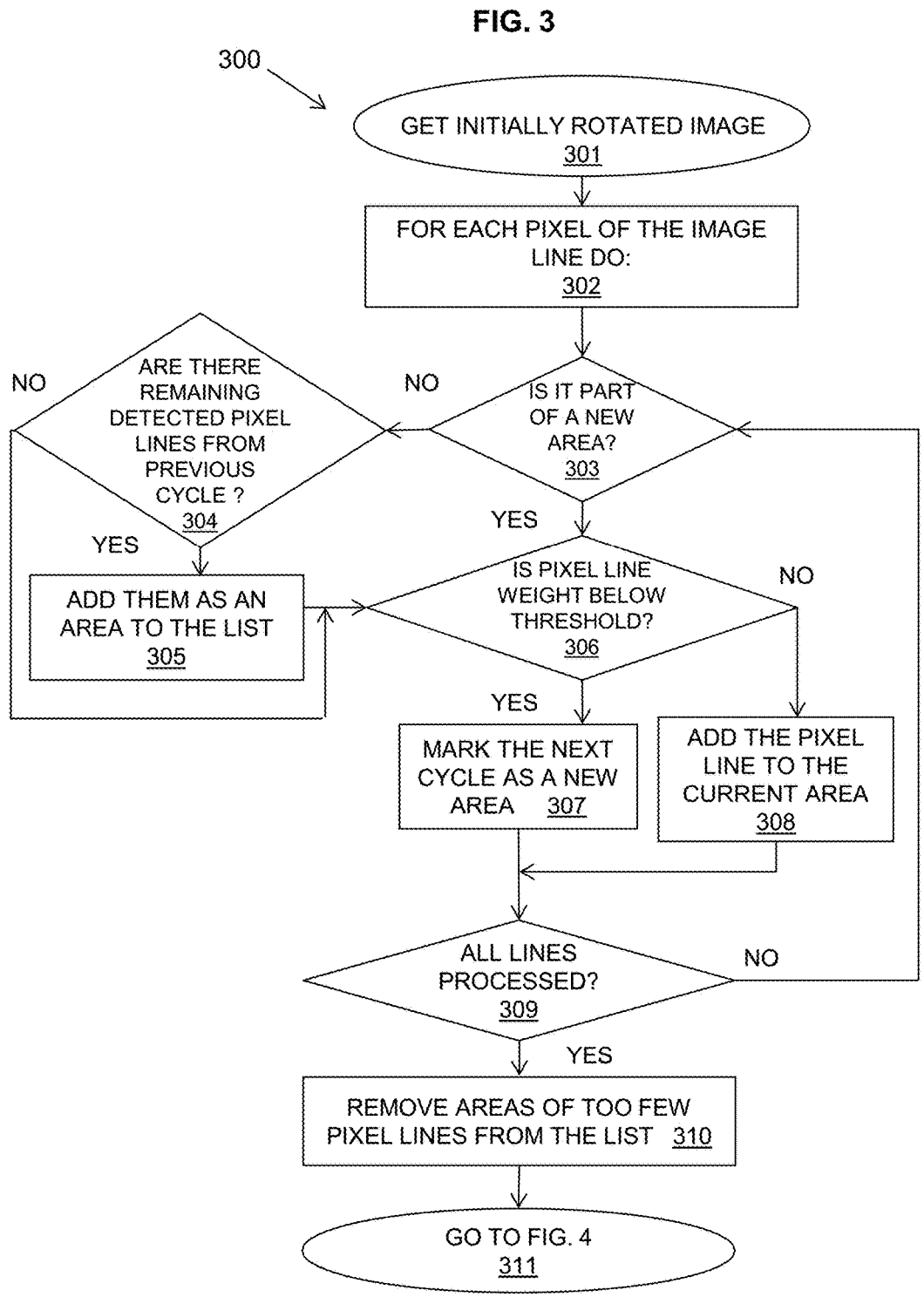
FIG. 3 is a flow diagram of further details of the method of FIG. 1.

Referring to FIG. 3, a flow diagram 300 illustrates further example implementation detail of step 105 of FIG. 1 of detecting text line areas as areas of adjacent lines, each line having a threshold number of non-empty pixels, wherein the text line area is between two empty lines.

The initially rotated pre-processed image and a list of empty/non-empty pixel lines are provided (step 301).

For each pixel line of the image (step 302), the following method is carried out.

It is determined (step 303) if the pixel line is part of a new text line area. If the pixel line is not part of a new text line area, it is determined (step 304) if there are remaining detected pixel lines from a previous cycle of the method. If so, the remaining detected pixel lines are added (step 305) as an area to a list.

If it is determined in step 303 that the pixel line is part of a new text line area, or after steps 304 and 305 have been carried out, it is then determined (step 306) if the weight of the pixel line is below a pixel line threshold. The pixel line weight of the pixel line is the total number of non-empty pixels in the pixel line. The pixel line threshold is expressed as a threshold number of non-empty pixels. If the pixel line weight is below the pixel line threshold, the pixel line is marked (step 307) as a new area in a next cycle. If the pixel line weight is at or above the pixel line threshold, the pixel line is added (step 308) to the current area.

It may then be determined (step 309) if all lines have been processed. If all lines have not been processed, the method loops to step 303 to process a next line.

For each pixel line area of the image, the pixel line is added to the current text line area if the weight of the pixel line is at or above the pixel line threshold. This pixel line threshold can be set as an input parameter or can be calculated based on the relative weights of other pixel lines on the page (e.g. the 60 percentile of all pixel lines). A new text line area is triggered when an empty line is encountered. The weight of the pixel line measures how strong the pixel line is and is measured according to what is similar to the other pixel lines. Detected text line areas that contain less non-empty pixel lines than a text area line threshold are removed. The text area line threshold is expressed as a threshold number of non-empty pixel lines. This text area line threshold can be set as an input parameter or can be calculated relative to the rest of text area lines on the page (e.g. the 50 percentile of all text area lines).

If all the lines have been processed, areas are removed (step 310) from the list with too few pixel lines. The method then proceeds (step 311) to the method of the flow diagram 400 of FIG. 4.

Figure 4:
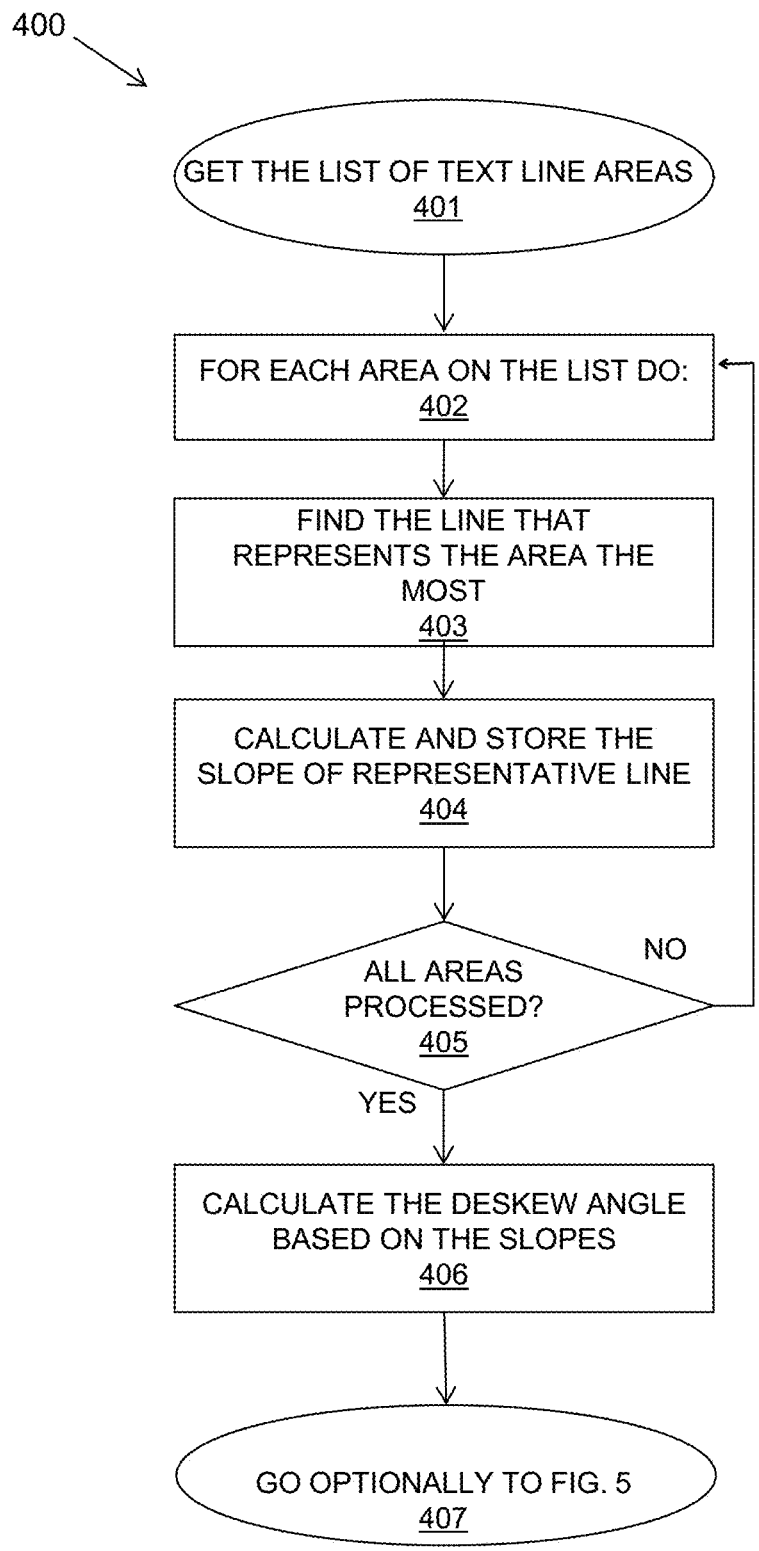
FIG. 4 is a flow diagram of further details of the method of FIG. 1.

Referring to FIG. 4, a flow diagram 400 shows further example implementation detail of steps 106, 107 and 108 of FIG. 1 of finding representative lines of each text line area, determining a slope of each representative lines, and determining an aggregated slope of all the representative lines in a digital image.

The list of text line areas is provided (step 401). For each area in the list, the following is carried out (step 402).

A line that represents the pixels of the area is calculated and stored (step 403). There are several calculation options that can be used. In one embodiment, linear regression is used. In other embodiments, any geometrical or statistical method may be used to obtain the representative line. Examples include calculating the mean point of a sample of two vertical lines within a text area, or the median or average of several such sample points. The representative line represents the slope of the text area, taking into consideration the characters within the line may be above and/or below the representative line. The representative line may be called the middle line for simplicity.

The slope of the representative line and, optionally, the starting and ending points of the representative line, is calculated and stored (step 404). The starting point is where x=0 and the ending point is at x=image width. The starting and ending points may be used for the optional vertical verification at the end of the method.

It is determined (step 405) if all the text line areas of an image have been processed. If all the text line areas of an image have not been processed, the method loops to step 402 to process the next text line area.

If all the text line areas of an image have been processed, the method may calculate (step 406) the page deskew angle based on the slopes of the representative lines of the text line areas calculated above. There are several calculation options that can be used. In one embodiment, the median is used to reduce the effect of the noise of extreme values (lines that are extremely skewed compared to the rest of the text lines detected). The method then optionally proceeds (step 407) to the method of the flow diagram 500 of FIG. 5.

Figure 5:
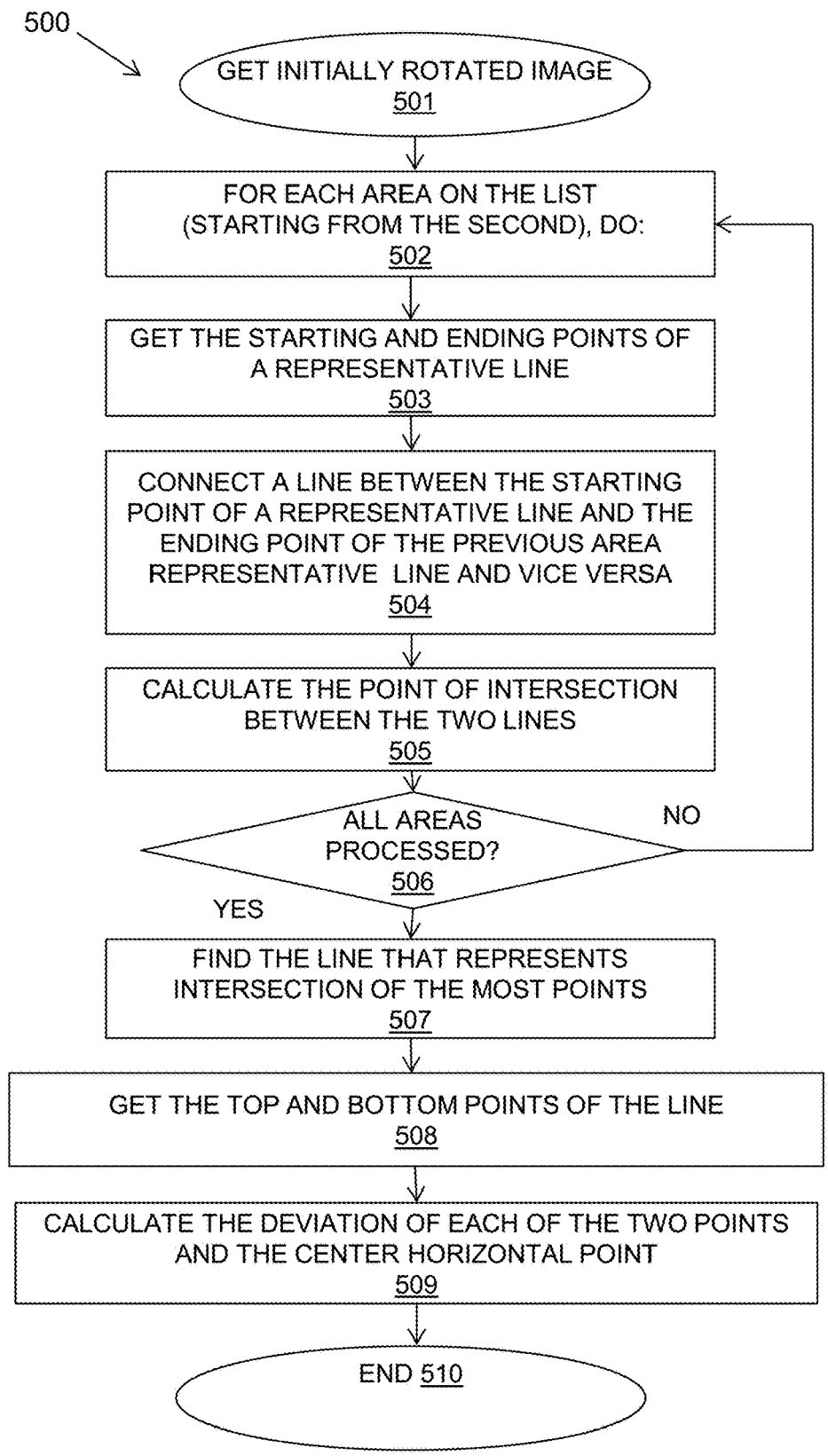
FIG. 5 is a flow diagram of further details of the method of FIG. 1.

Referring to FIG. 5, a flow diagram 500 shows further example implementation detail of step 109 of FIG. 1 of running a secondary validation of the angle using a vertical line determination.

The initially rotated image is provided (step 501). Starting at the second text line area and until the end of the text line areas, the following steps are carried out (step 502).

The starting point and the ending point of the representative line of the current text line are determined (step 503). A straight line is connected (step 504) between the starting point of the current representative line and an ending point of the previous representative line and vice versa. The point of intersection of the preceding two lines is calculated (step 505).

It is then determined (step 506) if all the areas have been processed. If not, the method loops to step 502 to process the next area.

In response to all text line areas having been processed, a line, called a "vertical line", that closely represents the points of intersection mentioned above is determined (step 507). There are several calculation options that can be used. In one embodiment, linear regression is used. The, the "vertical line" is a linear fit to the points of intersection and is determined by the points of intersection. Thus the vertical line is not required to be oriented in the vertical direction. However, the vertical line is oriented more closely to the vertical direction as the amount of skew of the digital image decreases.

The top and bottom points of the vertical line may be determined (step 508) and used to calculate (step 509) the deviation of each of the two points and the center horizontal point of the image. The method may then end (step 510). The top and bottom points of the vertical line are at the intersection of the vertical line with the top and bottom representative lines, respectively, in the vertical direction.

On a perfectly deskewed image, the vertical line is oriented parallel to the vertical direction defined by the rectangular coordinate system. For a skewed image, this vertical line will also be skewed, relative to the vertical direction, with the same angle relative to the vertical direction as the angle that the skewed image makes with a perfectly deskewed image. The maximum amount of horizontal deviation in the vertical line is at the most top (y=0) and the most bottom (y=image height) of that vertical line. If this horizontal deviation is above a certain threshold length that may be predefined as an input parameter to the algorithm, the quality of the initial rotation will be considered low. The horizontal deviation of this vertical line from the vertical direction may be optionally used in conduction with the deskew angle calculated earlier.

Figure 6A:
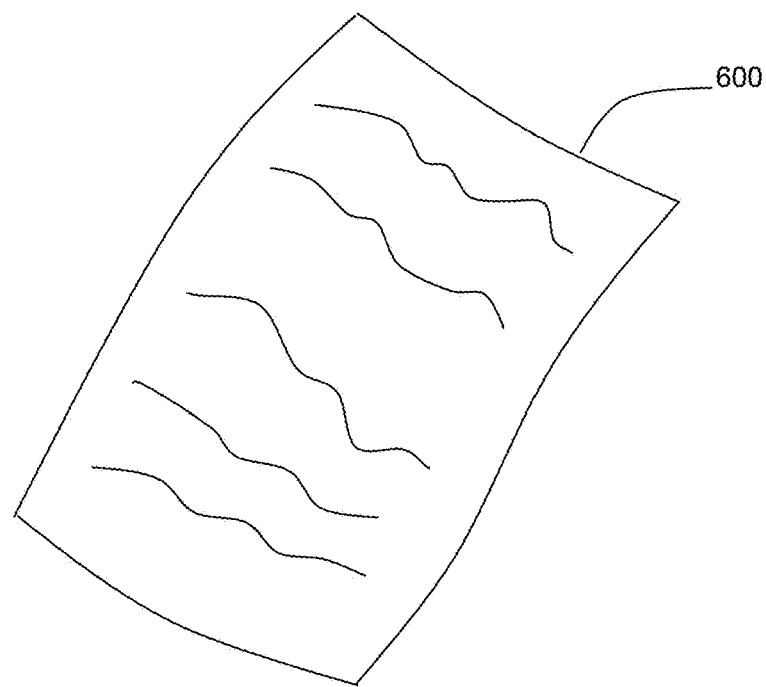
FIGS. 6A to 6F are schematic diagrams illustrating the method of the present invention as applied to a captured image, in accordance with embodiments of the present invention.

Referring to FIGS. 6A to 6E, schematic diagrams illustrate the above described method. FIG. 6A shows a skewed input digital image 600.

Figure 6B:
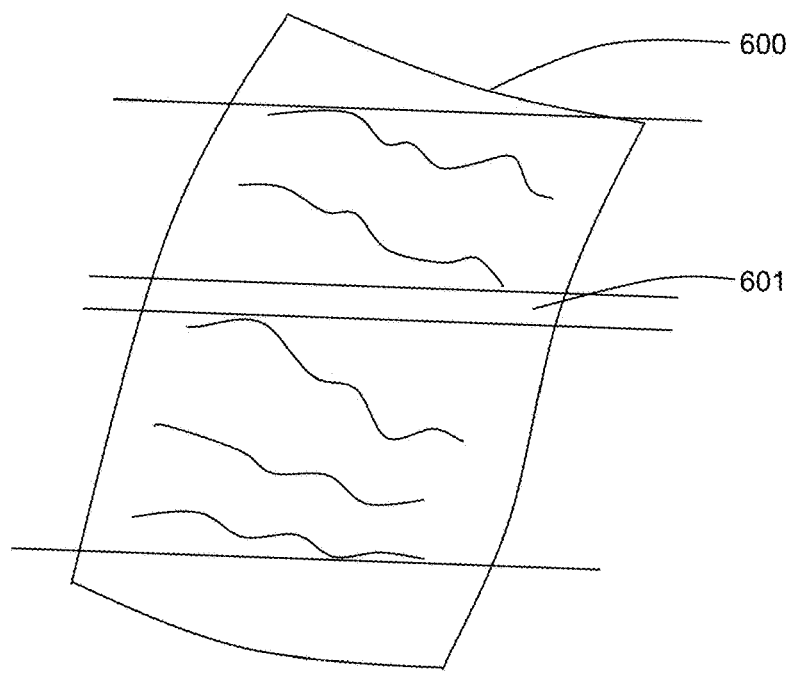
Figure 6C:
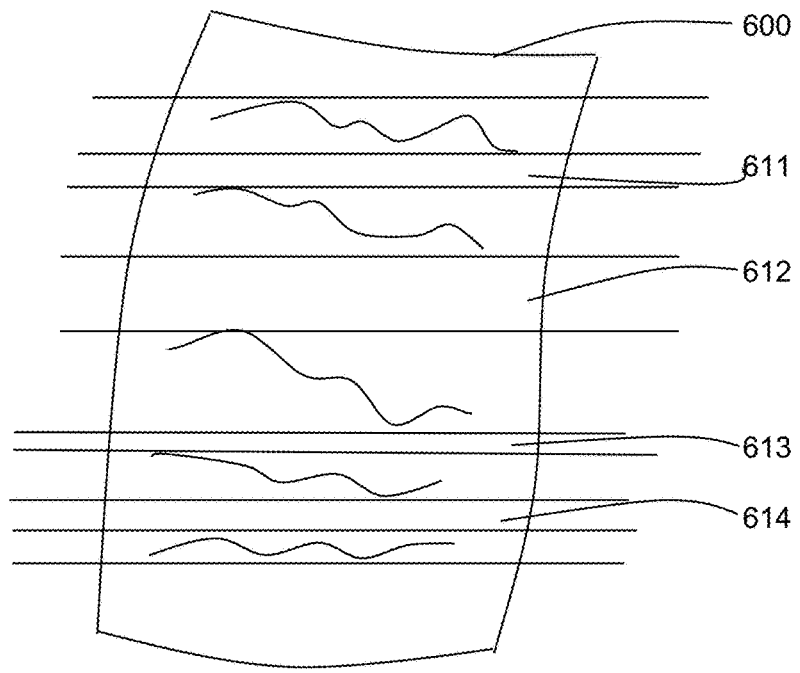
Figure 6D:
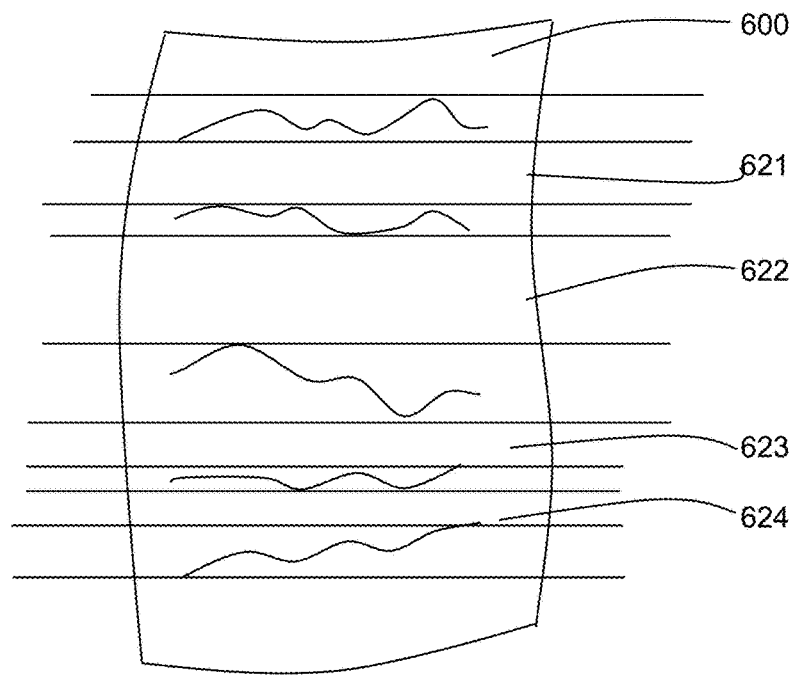

FIGS. 6B, 6C and 6D show the input digital image 600 having the method of FIG. 2 applied to determine an initial angle of rotation. The digital image 600 is shown in FIGS. 6B, 6C and 6D for three respective trial angles of rotation and for each trial angle, the number of empty areas is determined.

In FIG. 6B, only one empty area 601 is determined. In FIG. 6C, four empty areas are determined 611, 612, 613, 614. In FIG. 6D, four empty areas are also determined 621, 622, 623, 624 but they have a larger number of empty lines within them (the empty areas are wider) and therefore the initial angle of rotation of FIG. 6D is selected.

Figure 6E:
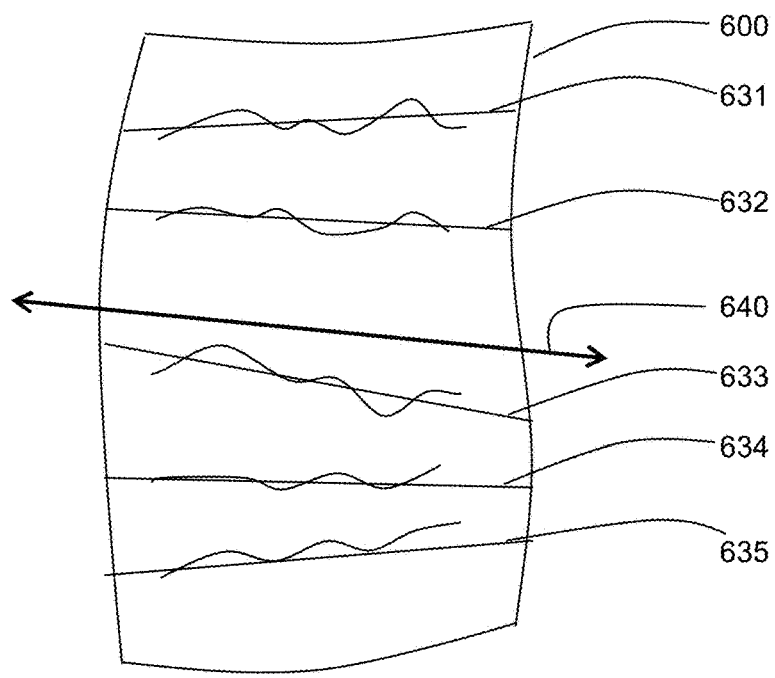

Referring to FIG. 6E, the digital image 600 with outcome of the methods of FIGS. 3 and 4 is shown. The digital image 600 is shown with five representative lines 631, 632, 633, 634, 635 determined, one for each of the non-empty areas of FIG. 6D. An aggregated slope 640 is also shown as a median of the slopes of the five representative lines 631, 632, 633, 634, 635. In one embodiment, the median slope is the slope of line 633 since line 633 is a median line between lines 631-632 and 634-635. In one embodiment, the median slope is the arithmetic average of the slopes of lines 632 and 633. In one embodiment, the median slope is a weighted average of the slopes of lines 631-632 (weight=2) and lines 633-635 (weight=3). In one embodiment, the median slope is a randomly selected slope between the slopes of lines 632 and 633.

Figure 6F:
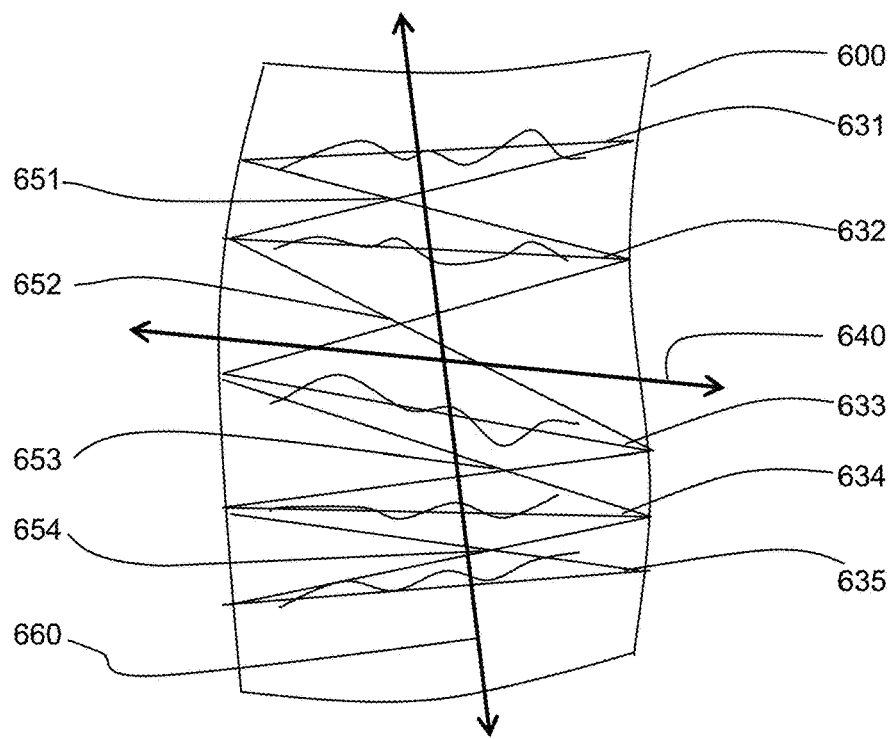

Referring to FIG. 6F, the digital image 600 with the outcome of the optional method of FIG. 5 is shown. Points of intersection 651, 652, 653, 654 of lines connecting opposing ends of adjacent representative lines 631, 632, 633, 634, 635 are determined. A vertical line 660 is then determined from the points of intersection 651, 652, 653, 654 as discussed supra (e.g., by linear regression). An angle of deviation between the vertical line 660 and a line perpendicular to the aggregated slope 640 provides an indication of the accuracy of the aggregated slope 640.

Figure 7:
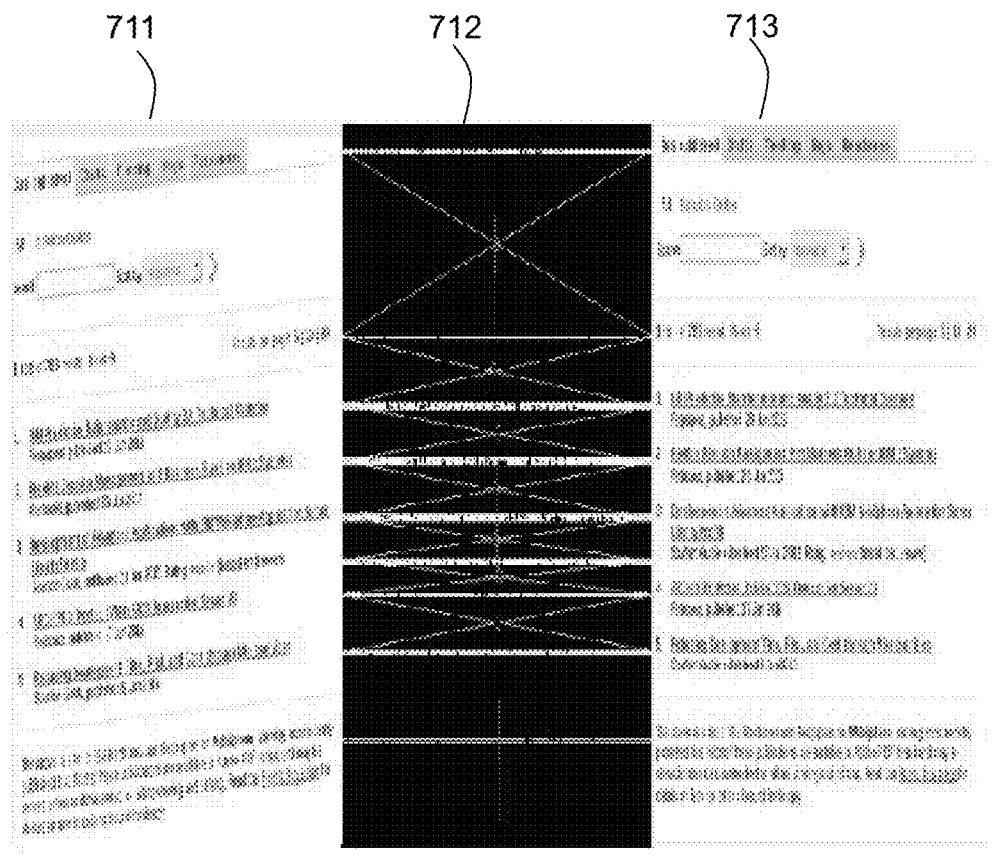
FIG. 7 is an example of captured image to which the method of the present invention has been applied, in accordance with embodiments of the present invention.

FIG. 7 illustrates an example showing an initial digital image 711 a processing of the image 712 and a resultant image 713 with the deskewing angle applied.

The described method advantageously reduces the effect of noise over the series of method steps which allows for better ability to process scanned documents of low quality. The low quality may be for many reasons, for example, due to an inefficient scanning process or due to the poor state of the original scanned document.

The described method advantageously uses cost effective method while trying to reach the best starting rotation angle, whereas it uses a more costly processing to fine tune the initial rotation angle based on the content of detected text lines.

The criterion for detecting the initial rotation angle is cheaper in calculation cost as it relies on the number of empty lines (line spacing) as opposed to the content of the lines detected. The method does not process text line content while trying different rotation angles.

The described method includes an optional secondary validation based on another characteristic of deviation of the vertical line from the vertical axis of the same content detected. This characteristic is different from the one used to calculate the deskew angle which is the collective slopes of text lines. The secondary validation aggregates the value of the characteristic over all detected text lines as opposed to individual text lines which can lead to inaccuracy depending on the quality of text line detection.

The described method has no dependency on the language or the font of the text in the scanned document, the quality of the text or even having parallel text lines. The described method also processes both machine printed scanned documents or handwritten scanned documents where text lines do not have to be parallel or be skewed at the same angle.

The described method also covers a high rotation range of 180 degrees, from −90 to +90 degrees.

Figure 8:
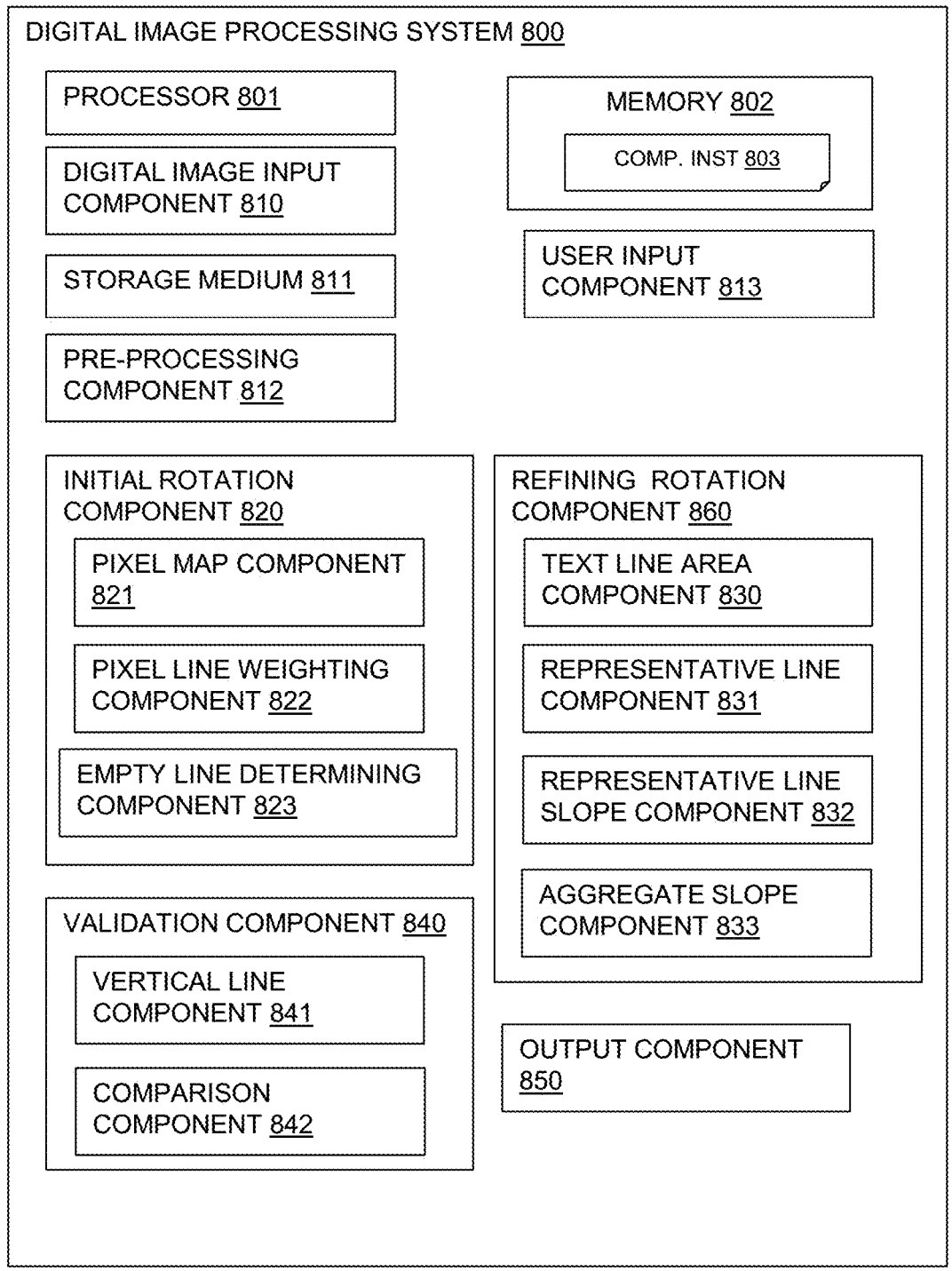
FIG. 8 is block diagram of an example embodiment of a system in accordance with embodiments of the present invention.

Referring to FIG. 8, a block diagram shows an example embodiment of a digital image processing system 800 implementing the described method.

The digital image processing system 800 may include at least one at least one processor 801, a hardware module, or a circuit for executing the functions of the described components which may be software units executing on the at least one processor.

Multiple processors running parallel processing threads may be provided, enabling parallel processing of some or all of the functions of the components. Memory 802 may be configured to provide computer instructions 803 to the at least one processor 801 to carry out the functionality of the components.

The digital image processing system 800 may include a digital image input component 810 for receiving a digital image from a scanner, camera or from an existing memory file, and optionally storing the digital image in a storage medium or storage device 811 for processing.

A user configuration component 813 may be provided to enable a user or operator of the system to include configuration parameters for controlling the digital image processing, including providing threshold levels for the processing. A pre-processing component 812 may carry out pre-processing of the digital image to reduce noise in the image.

An initial rotation component 820 may determine an initial angle of rotation using the method of FIG. 2. This may include additional components of a pixel map component 821, a pixel line weighting component 822, and an empty line determining component 823.

A refining rotation component 860 may be provided for processing the first rotated image to determine a refining angle of rotation by further processing. The refining rotation component 860 may carry out the method of FIGS. 3 and 4. A text line area component 830 may determine text line areas. A representative line component 831 may find individual best lines for each text line area, and a representative line slope component 832 may find the slope of each representative line. An aggregate slope component 833 may find the aggregated slope of the representative lines.

A validation component 840 may carry out the method of FIG. 5 of validating the aggregated slope. A vertical line component 841 may construct a substantially vertical line and a comparison component 842 may compare this to the aggregated slope and may output a validation result.

An output component 850 may rotate the digital image by the determined best angle.

Figure 9:
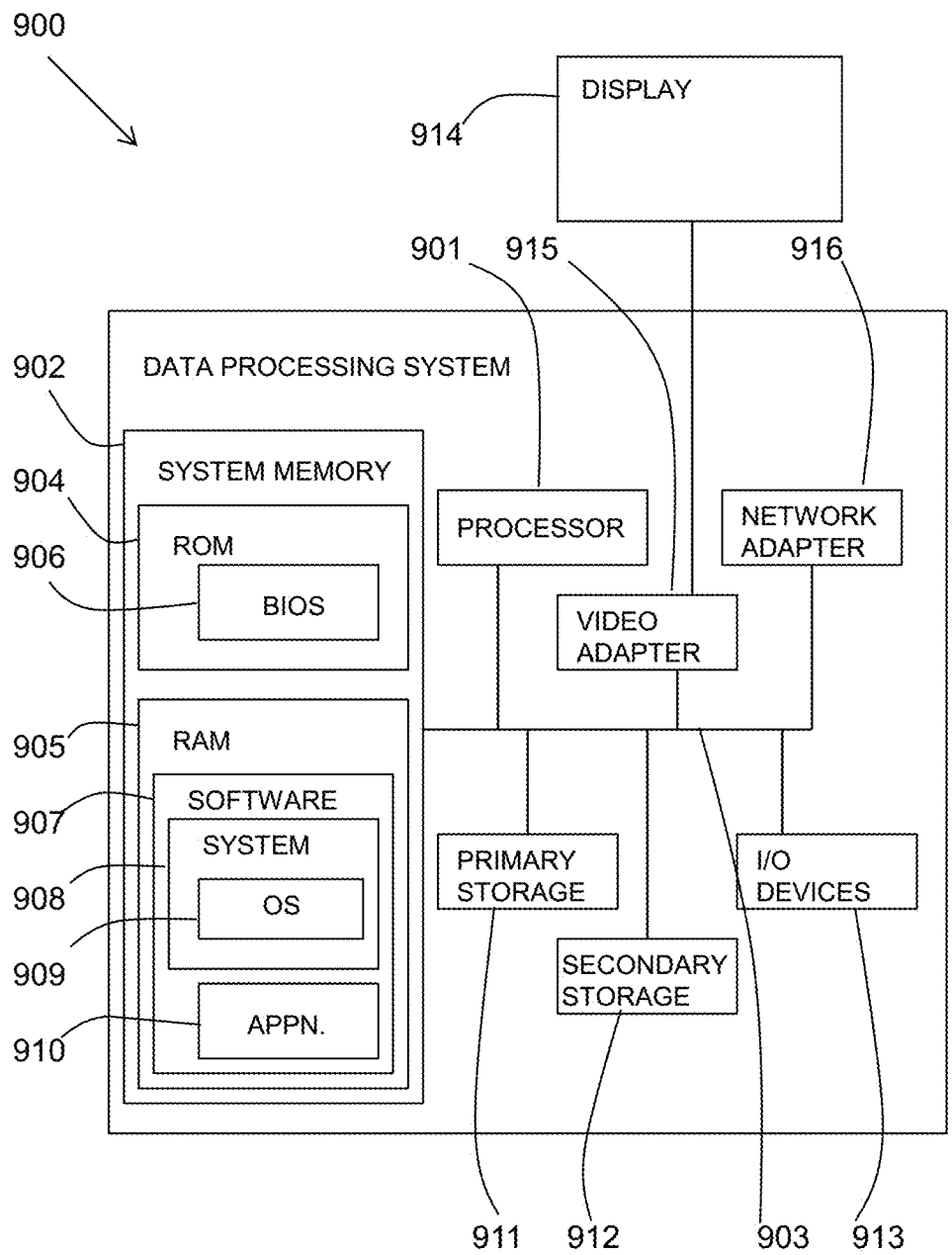
FIG. 9 is a block diagram of an embodiment of a computer system in which the present invention may be implemented.

Referring to FIG. 9, an exemplary system for implementing aspects of the invention includes a data processing system 900 suitable for storing and/or executing program code including at least one processor 901 coupled directly or indirectly to memory elements through a bus system 903. The memory elements may include local memory employed during actual execution of the program code, bulk storage, and cache memories which provide temporary storage of at least some program code in order to reduce the number of times code must be retrieved from bulk storage during execution.

The memory elements may include system memory 902 in the form of read only memory (RUM) 904 and random access memory (RAM) 905. A basic input/output system (BIOS) 906 may be stored in ROM 904. Software 907 may be stored in RAM 905 including system software 908 such as operating system software 909. Software applications 910 including one or more applications for implementing the method discussed with respect to FIG. 1 may also be stored in RAM 905, elsewhere in system memory 902, in primary storage means 911, and/or secondary storage means 912.

The system 900 may also include primary storage means 911 such as a magnetic hard disk drive and secondary storage means 912 such as a magnetic disc drive and an optical disc drive. The drives and their associated computer-readable media provide non-volatile storage of computer-executable instructions, data structures, program modules and other data for the system 900. Software applications may be stored on the primary and secondary storage means 911, 912 as well as the system memory 902.

The computing system 900 may operate in a networked environment using logical connections to one or more remote computers via a network adapter 916.

Input/output devices 913 may be coupled to the system either directly or through intervening I/O controllers. A user may enter commands and information into the system 900 through input devices such as a keyboard, pointing device, or other input devices (for example, microphone, joy stick, game pad, satellite dish, scanner, or the like). Output devices may include speakers, printers, etc. A display device 914 is also connected to system bus 903 via an interface, such as video adapter 915.

The present invention may be a system a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD) a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises a computer readable hardware storage device having computer readable program code stored therein, said program code containing instructions executable by a processor of a computer system to implement the methods of the present invention.

A computer system of the present invention comprises a processor, a memory, and a computer readable hardware storage device, said storage device containing program code executable by the processor via the memory to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A method, said method comprising:
    determining an initial angle of rotation by sampling a plurality of test angles of rotation of a captured digital image and analyzing resultant rotated images to determine a resultant rotated image with a highest number of substantially empty lines, wherein said determining the initial angle of rotation does not process content of text lines resulting in low processing costs;
    rotating the captured digital image by the initial angle of rotation to generate a first rotated image;
    generating a representative line of each line area of multiple text line areas of the first rotated image;
    calculating a slope of each representative line;
    determining an aggregated slope of all of the representative lines in the first rotated image, wherein the aggregated slope is converted to a refining angle of rotation;
    validating the refining angle of rotation by finding points of intersection of lines connecting opposing ends of adjacent representative lines, and estimating a substantially vertical line through the point of intersection, wherein the difference between the substantially vertical line and a line perpendicular to the aggregated slope indicates the accuracy of the refining angle of rotation; and
    rotating the first rotated image by the refining angle of rotation to result in a final rotated image.

2. The method of claim 1, wherein said determining the initial angle of rotation, includes:
    sampling a plurality of test angles at regular angle intervals of rotation.

3. The method of claim 1, wherein said determining the initial angle of rotation, includes:
    sampling a plurality of test angles in a range of −90 degrees to +90 degrees rotation.

4. The method of claim 1, wherein said determining the initial angle of rotation, includes for each resultant rotated image of a sample test angle:
    converting the resultant rotated image into a pixel map with each pixel in the pixel map being determined to be empty or non-empty by applying a pixel content threshold;
    weighting each line of pixels in the pixel map according to a number of non-empty pixels in said each line;
    determining an empty line in the pixel map as a line of pixels in the pixel map with a weight less than a line content threshold; and
    counting a number of empty lines in the resultant rotated image.

5. The method of claim 1, said method further comprising:
    determining the text line areas of the first rotated image by forming areas of adjacent pixel lines, wherein the adjacent pixel lines are each above a threshold weight of non-empty pixels, and wherein the determined text line areas are separated by at least one pixel line below the threshold weight of non-empty pixels.

6. The method of claim 1, wherein said generating the representative line of each text line area uses a geometrical or statistical method of averaging a text line area.

7. The method of claim 1, said method further comprising:
    pre-processing the captured digital image to reduce noise by filtering extraneous detail from the captured digital image.

8. A computer system, comprising a processor, a memory coupled to the processor, and a computer readable storage device coupled to the processor, said storage device containing program code executable by the processor via the memory to implement a method, said method comprising:
- determining an initial angle of rotation by sampling a plurality of test angles of rotation of a captured digital image and analyzing resultant rotated images to determine a resultant rotated image with a highest number of substantially empty lines, wherein said determining the initial angle of rotation does not process content of text lines resulting in low processing costs;
- rotating the captured digital image by the initial angle of rotation to generate a first rotated image;
- generating a representative line of each line area of multiple text line areas of the first rotated image;
- calculating a slope of each representative line;
- determining an aggregated slope of all of the representative lines in the first rotated image, wherein the aggregated slope is converted to a refining angle of rotation;
- validating the refining angle of rotation by finding points of intersection of lines connecting opposing ends of adjacent representative lines, and estimating a substantially vertical line through the point of intersection, wherein the difference between the substantially vertical line and a line perpendicular to the aggregated slope indicates the accuracy of the refining angle of rotation; and
- rotating the first rotated image by the refining angle of rotation to result in a final rotated image.

9. The computer system of claim 8, wherein said determining the initial angle of rotation, includes:
- sampling a plurality of test angles at regular angle intervals of rotation.

10. The computer system of claim 8, wherein said determining the initial angle of rotation, includes:
- sampling a plurality of test angles in a range of −90 degrees to +90 degrees rotation.

11. The computer system of claim 8, wherein said determining the initial angle of rotation, includes for each resultant rotated image of a sample test angle:
- converting the resultant rotated image into a pixel map with each pixel in the pixel map being determined to be empty or non-empty by applying a pixel content threshold;
- weighting each line of pixels in the pixel map according to a number of non-empty pixels in said each line;
- determining an empty line in the pixel map as a line of pixels in the pixel map with a weight less than a line content threshold; and
- counting a number of empty lines in the resultant rotated image.

12. The computer system of claim 8, said method further comprising:
- determining the text line areas of the first rotated image by forming areas of adjacent pixel lines, wherein the adjacent pixel lines are each above a threshold weight of non-empty pixels, and wherein the determined text line areas are separated by at least one pixel line below the threshold weight of non-empty pixels.

13. A computer program product, comprising a computer readable hardware storage device having computer readable program code stored therein, said program code containing instructions executable by a processor of a computer system to implement a method, said method comprising:
- determining an initial angle of rotation by sampling a plurality of test angles of rotation of a captured digital image and analyzing resultant rotated images to determine a resultant rotated image with a highest number of substantially empty lines, wherein said determining the initial angle of rotation does not process content of text lines resulting in low processing costs;
- rotating the captured digital image by the initial angle of rotation to generate a first rotated image;
- generating a representative line of each line area of multiple text line areas of the first rotated image;
- calculating a slope of each representative line;
- determining an aggregated slope of all of the representative lines in the first rotated image, wherein the aggregated slope is converted to a refining angle of rotation;
- validating the refining angle of rotation by finding points of intersection of lines connecting opposing ends of adjacent representative lines, and estimating a substantially vertical line through the point of intersection, wherein the difference between the substantially vertical line and a line perpendicular to the aggregated slope indicates the accuracy of the refining angle of rotation; and
- rotating the first rotated image by the refining angle of rotation to result in a final rotated image.

14. The computer program product of claim 13, wherein said determining the initial angle of rotation, includes:
- sampling a plurality of test angles at regular angle intervals of rotation.

15. The computer program product of claim 13, wherein said determining the initial angle of rotation, includes:
- sampling a plurality of test angles in a range of −90 degrees to +90 degrees rotation.

16. The computer program product of claim 13, wherein said determining the initial angle of rotation, includes for each resultant rotated image of a sample test angle:
- converting the resultant rotated image into a pixel map with each pixel in the pixel map being determined to be empty or non-empty by applying a pixel content threshold;
- weighting each line of pixels in the pixel map according to a number of non-empty pixels in said each line;
- determining an empty line in the pixel map as a line of pixels in the pixel map with a weight less than a line content threshold; and
- counting a number of empty lines in the resultant rotated image.

17. The computer program product of claim 13, said method further comprising:
- determining the text line areas of the first rotated image by forming areas of adjacent pixel lines, wherein the adjacent pixel lines are each above a threshold weight of non-empty pixels, and wherein the determined text line areas are separated by at least one pixel line below the threshold weight of non-empty pixels.

* * * * *